United States Patent
Muñoz De La Torre Alonso et al.

(10) Patent No.: US 12,556,525 B2
(45) Date of Patent: Feb. 17, 2026

(54) NETWORK SUPPORTED AUTHENTICATION

(71) Applicant: Telefonaktiebolaget LM Ericsson (publ), Stockholm (SE)

(72) Inventors: Miguel Angel Muñoz De La Torre Alonso, Madrid (ES); Alfonso De Jesus Perez Martinez, Madrid (ES); Rodrigo Alvarez Dominguez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 18/558,317

(22) PCT Filed: Oct. 25, 2021

(86) PCT No.: PCT/EP2021/079568
§ 371 (c)(1),
(2) Date: Oct. 31, 2023

(87) PCT Pub. No.: WO2022/248073
PCT Pub. Date: Dec. 1, 2022

(65) Prior Publication Data
US 2024/0223547 A1    Jul. 4, 2024

(30) Foreign Application Priority Data

May 24, 2021 (EP) .................................. 21382470

(51) Int. Cl.
*H04L 9/40* (2022.01)
*H04L 9/32* (2006.01)
*H04W 12/37* (2021.01)

(52) U.S. Cl.
CPC ............... *H04L 63/08* (2013.01); *H04L 9/32* (2013.01); *H04W 12/37* (2021.01)

(58) Field of Classification Search
CPC ....... H04W 12/06; H04W 4/14; H04W 12/08; H04L 63/0838; H04L 63/083;
(Continued)

(56) References Cited

U.S. PATENT DOCUMENTS

| 12,204,632 B1 * | 1/2025 | Chauhan | H04W 12/30 |
| 2015/0188907 A1 * | 7/2015 | Khalid | H04L 63/0815 726/8 |

(Continued)

FOREIGN PATENT DOCUMENTS

WO    2020033905 A1    2/2020

OTHER PUBLICATIONS

"3GPP TS 23.203 V17.0.0", 3rd Generation Partnership Project; Technical Specification Group Services and System Aspects; Policy and charging control architecture (Release 17), Mar. 2021, pp. 1-267.

(Continued)

*Primary Examiner* — Tae K Kim
(74) *Attorney, Agent, or Firm* — Murphy, Bilak & Homiller, PLLC

(57) ABSTRACT

Embodiments of the invention can relate to various methods for operating a network exposure entity (270) and/or a policy control entity in a wireless communications network (200), in which a data packet session can be provided between a service provider (300) and a user equipment (100), the methods comprising steps for enabling the wireless communications network (200) to take an active role in a multi-factor authentication procedure requested by the service provider (300). Further embodiments of the invention relate to respective network exposure entities (270) and/or policy control entities.

17 Claims, 8 Drawing Sheets

(58) Field of Classification Search
CPC . H04L 63/08; H04L 9/32; H04L 9/321; H04L 9/3213; H04L 9/3226; H04L 9/3228; H04L 63/0807; H04L 2463/082; G06F 21/313; G06F 21/31
See application file for complete search history.

(56) References Cited

U.S. PATENT DOCUMENTS

| | | | |
|---|---|---|---|
| 2019/0261260 A1* | 8/2019 | Dao | H04W 48/00 |
| 2020/0068483 A1* | 2/2020 | Likar | H04W 76/11 |
| 2021/0058784 A1* | 2/2021 | Kedalagudde | H04W 76/12 |
| 2021/0273945 A1* | 9/2021 | Lakunishok | H04L 63/102 |
| 2021/0329460 A1* | 10/2021 | Liao | H04W 12/37 |
| 2022/0272538 A1* | 8/2022 | Christian | H04W 12/128 |
| 2022/0360954 A1* | 11/2022 | Castellanos Zamora | H04W 8/18 |
| 2023/0109272 A1* | 4/2023 | Ryu | H04L 63/0892 370/329 |
| 2024/0089710 A1* | 3/2024 | Rustagi | H04W 4/14 |

OTHER PUBLICATIONS

"3GPP TS 23.501 V17.0.0", 3rd Generation Partnership Project; Technical Specification Group Services and System Aspects; System architecture for the 5G System (5GS); Stage 2 (Release 17), Mar. 2021, pp. 1-489.

"3GPP TS 29.522 V17.0.0", 3rd Generation Partnership Project; Technical Specification Group Core Network and Terminals; 5G System; Network Exposure Function Northbound APIs; Stage 3 (Release 17), Dec. 2020, pp. 1-168.

"3GPP TS 23.502 V17.1.0", 3rd Generation Partnership Project; Technical Specification Group Services and System Aspects; Procedures for the 5G System (5GS); Stage 2 (Release 17), Jun. 2021, pp. 1-692.

"3GPP TS 23.003 V17.1.0", 3rd Generation Partnership Project; Technical Specification Group Core Network and Terminals; Numbering, addressing and identification; (Release 17), Mar. 2021, pp. 1-143.

* cited by examiner

NETWORK SUPPORTED AUTHENTICATION

TECHNICAL FIELD

The present invention relates to various methods and devices for allowing a wireless communications network to take an active role in a user authentication for a service provider, external to the wireless communications network. Preferably, the authentication is part of a multi-factor authentication of a user of a user equipment connected to the wireless communications network.

BACKGROUND

FIG. 1 shows a 5G NR architecture with service based interfaces. The 5G core network part comprises a Network Slice Selection Function, NSSF 10, a Network Exposure Function 15, a Network Repository Function, NRF, 20, a Policy Control Function, PCF, 25, a Unified Data Management, UDM, 30, an Application Function, AF, 35, an Authentication Server Function, AUSF, 40, an Access and Mobility Management Function, AMF, 45, and a Session Management Function, SMF, 50. A User Equipment, UE, 60, is connected to the Radio Access Network, RAN, 70, wherein a User Plane Function, UPF, 80 is provided to connect the UE 60 to a data network, DN, 90.

Having service based interfaces in the 5G Core Control Plane (CP) implies that the Network Functions, NFs, in the 5G Core CP provide services that are consumed by other NFs in the 5G Core CP.

The roles of these entities and the interfaces have been defined in the 3GPP TS 23.501 and the procedures have been described in TS 23.502.

The most relevant 5G System Architecture network functions for this invention are the following:
- AF, 35, interacts with the 3GPP Core Network so as to provide information that will allow network operator to manage application's traffic in a certain way;
- NEF 15 is the entry point for ASPs (Application Service Providers) to the Mobile Network Operator Network a.k.a. Connectivity Service Provider (CSP). NEF 15 exposes the Connectivity Service Provider Mobile Network capabilities to the ASPs and translates between information as known by the external Application Functions (AFs) and information as known by the Mobile Network Function/s.
- PCF, 25, supports unified policy framework to govern the network behaviour. In particular, PCF 25 provides Policy and Charging Control, PCC, rules to the Policy and Charging Enforcement Function, PCEF, that is, SMF 50/UPF 80 that enforces policy and charging decisions according to provisioned PCC rules;
- SMF 50 is responsible for Session establishment, modification and release, including selection and control of the UPF 80 entities. SMF 50 interacts with the UPF 80 over N4 Reference point using PFCP (Packet Flow Central Protocol) procedures. Moreover, SMF 50 receives PCC rules from PCF 25 and configures the UPF 80 accordingly;
- UPF, 80, supports handling of user plane traffic based on the rules received from SMF, in particular packet inspection and different enforcement actions (QoS, Charging, etc.)
- BSF (Binding Support Function, not shown in FIG. 1) is used to find the PCF in charge of the user PDU connection policy session in scenarios with more than one PCF.

In the Packet Core of the 4G System Architecture:
- PCRF (Policy and Charging Rules Function) plays the role of the PCF above;
- PGW-C(Control plane of the Packet Data Network Gateway) and/or TDF-C(Control plane of the Traffic Detection Function) plays the role of the SMF above;
- PGW PGW-U (User plane of the Packet Data Network Gateway) and/or TDF-U (User plane of the Traffic Detection Function) plays the role of the UPF above;
- SCEF (Service Capability Exposure Function) plays the role of NEF above, at least for the APIs (Application Programming Interfaces) listed above which are supported also in 4G;
- SCS/AF (Service Capability Server/Application Function) plays the role of AF above.

The 5G network, as well as previous networks such as LTE, can be used as part of a multi-factor authentication of a user. Multi-factor authentication (MFA), encompassing for instance techniques such as two-factor authentication or 2FA, is an electronic authentication method in which a user is granted access to an object or a service, such as to a website, a locked car or house, an ATM, etc., only after successfully presenting to an authentication mechanism two or more pieces of evidence, or factors, among:
- knowledge: something only the user knows
- possession: something only the user has, and
- inherence: something only the user is.

Multi-factor authentication is in particular a commonly used technique for protecting the user from an unknown person trying to access their data such as personal ID details or financial assets.

Several currently existing solutions for multi-factor authentication are commonly based on sending a message with a pin code to a rightful user. This message is sent for instance through an SMS, a push notification or an app, or an email. This, however, is not secure enough.

For instance if a malicious user has managed to duplicate a SIM card of the rightful user, or managed to register an application with a PUI (MSISDN) different to the one corresponding to the PDU session established, it might be possible for the malicious user to receive the message which was intended for the rightful user.

SUMMARY

Accordingly, there is a need for techniques which allow the security of multi-factor authentication to be improved. This need is met by the features of the independent claims. Further aspects are described in the dependent claims.

An embodiment of the invention can in particular relate to a method for operating a network exposure entity in a wireless communications network, in which a data packet session can be provided between a service provider and a user equipment, the method comprising the steps of: receiving an external authentication request from the service provider for requesting the wireless communications network to execute an authentication of the user equipment with the service provider, wherein the external authentication request comprises an identifier of the user equipment, wherein the external authentication request further comprises an authentication identifier for indicating to the wireless communications network how to execute the authentication, authorizing the external authentication request based on one or more external criteria, wherein the one or more external criteria comprise whether the user equipment is registered in the wireless communications network, transmitting an internal authentication request to a policy control entity, wherein the internal authentication request is configured to cause the wireless communications network to perform the authentication in accordance with the authentication identifier.

In some embodiments, the authentication identifier can indicate an SMS-based authentication, and the internal authentication request can cause the wireless communications network to send an authentication SMS to the user equipment.

In some embodiments, the external authentication request, the internal authentication request and the SMS can further comprise a security code for the authentication.

In some embodiments, the method can further comprise receiving an internal authentication response from the policy control entity, in response to the internal authentication request, indicating successful delivery of the authentication SMS, and transmitting an external authentication response to the service provider, in response to the external authentication request, indicating successful delivery of the authentication SMS.

In some embodiments, the external authentication request can further comprise an identifier of the service provider, the method can further comprise the step of receiving a service registration request from the service provider, wherein the service registration request comprises an identifier of a service provider, wherein the one or more external criteria can further comprise whether the identifier of the service provider received with the external authentication request corresponds to the identifier of the service provider previously received with the service registration request.

In some embodiments, the method can further comprise receiving a user registration request from the service provider, wherein the user registration request comprises an identifier of a user equipment, wherein the one or more external criteria can further comprise whether the identifier of the user equipment received with the external authentication request corresponds to the identifier of the user equipment previously received with the user registration request.

Moreover, an embodiment of the invention can relate to a method for operating a network exposure entity in a wireless communications network, in which a data packet session can be provided between a service provider and a user equipment, the method comprising the steps of: receiving a service registration request from the service provider for registering with the wireless communications network in order to execute an authentication of the user equipment, wherein the service registration request comprises an identifier of the service provider, and one or more application identifiers, for identifying applications which can require authentication of the user equipment, transmitting a service storage request to a subscriber database, the service storage request comprising the identifier of the service provider, and the one or more application identifiers.

Additionally, an embodiment of the invention can further relate to a method for operating a network exposure entity in a wireless communications network, in which a data packet session can be provided between a service provider and a user equipment, the method comprising the steps of: receiving a user registration request from the service provider for registering one or more users with the wireless communications network in order to execute an authentication of the user equipment, wherein the user registration request comprises an identifier of the service provider, and one or more identifiers of user equipment, for identifying user equipment which can require authentication with the service provider, transmitting a user storage request to a subscriber database, the user storage request comprising the identifier of the service provider, and the one or more identifiers of user equipment.

In some embodiments, the user registration request and the user storage request can further comprise one or more application identifiers, for identifying applications which can require authentication of the user equipment.

In some embodiments, the identifier of the user equipment can comprise one or more of an IP address of the user equipment and/or a phone number of the user equipment.

Furthermore, an embodiment of the invention can relate to a method for operating a policy control entity in a wireless communications network, in which a data packet session can be provided between a service provider and a user equipment, the method comprising the steps of: receiving an internal authentication request from a network exposure entity for requesting the wireless communications network to execute an authentication of the user equipment with the service provider, authorizing the internal authentication request based on one or more internal criteria, transmitting a message request to a message control entity for sending an authentication message to the user equipment.

In some embodiments, the one or more internal criteria can comprise whether the user equipment has an active data packet session in the wireless communications network.

In some embodiments, the internal authentication can request comprises a phone number, and the one or more internal criteria can comprise whether the phone number corresponds to a phone number of the user equipment.

In some embodiments, the internal authentication request can comprise an IP address, and the one or more internal criteria can comprise whether the IP address corresponds to an IP address of the user equipment.

In some embodiments, the one or more internal can criteria comprise whether an association between at least two among the following data has not changed with respect to a previous authentication:

International Mobile Equipment Identity of the user equipment,
phone number of the user equipment,
subscriber information associated by the wireless communications network to the user equipment.

In some embodiments, the method can further comprise the step of receiving an application identifier from a session control entity for indicating execution of an application at the user equipment, wherein the internal authentication request can comprise an application identifier, and wherein the one or more internal criteria can comprise whether the application identifier received with the internal authentication request corresponds to the application identifier received from the session control entity.

In some embodiments, the method can further comprise receiving registration data from a subscriber database, the registration data comprising one or more application identifier and one or more subscriber identifier, wherein the internal authentication request can comprise an application identifier, wherein the one or more internal criteria can comprise whether the application identifier received with the internal authentication request corresponds to the application identifier received from the subscriber database.

In some embodiments, the method can further comprise receiving from a session control entity a policy request associated with the user equipment, retrieving from a subscriber database one or more application identifiers, for identifying applications which can require authentication of the user equipment, generating policies for the user equipment indicating that execution of the one or more applications is to be notified to the wireless communications network, transmitting the policies to a session control entity.

Additionally, further embodiments of the invention can relate to a network exposure entity for a wireless communications network, in which a data packet session can be provided between a service provider and a user equipment, the network exposure entity comprising a processing unit and a memory, the memory comprising instructions configured to cause the processing unit to carry out any of the steps described in connection with the network exposure entity.

Furthermore, further embodiments of the invention can relate to a policy control entity for a wireless communications network, in which a data packet session can be provided between a service provider and a user equipment, the policy control entity comprising a processing unit and a memory, the memory comprising instructions configured to cause the processing unit to carry out any of the steps previously described in connection with the policy control entity.

Moreover, any of the entities can also be implemented by modules implementing the functionalities of the respective steps.

In particular, an embodiment of the invention can in particular relate to a network exposure for a wireless communications network, in which a data packet session can be provided between a service provider and a user equipment, the network exposure entity comprising: a module for receiving an external authentication request from the service provider for requesting the wireless communications network to execute an authentication of the user equipment with the service provider, wherein the external authentication request comprises an identifier of the user equipment, wherein the external authentication request further comprises an authentication identifier for indicating to the wireless communications network how to execute the authentication, a module for authorizing the external authentication request based on one or more external criteria, wherein the one or more external criteria comprise whether the user equipment is registered in the wireless communications network, a module for transmitting an internal authentication request to a policy control entity, wherein the internal authentication request is configured to cause the wireless communications network to perform the authentication in accordance with the authentication identifier.

Moreover, an embodiment of the invention can relate to a network exposure entity for a wireless communications network, in which a data packet session can be provided between a service provider and a user equipment, the network exposure entity comprising: a module for receiving a service registration request from the service provider for registering with the wireless communications network in order to execute an authentication of the user equipment, wherein the service registration request comprises an identifier of the service provider, and one or more application identifiers, for identifying applications which can require authentication of the user equipment, a module for transmitting a service storage request to a subscriber database, the service storage request comprising the identifier of the service provider, and the one or more application identifiers.

Additionally, an embodiment of the invention can further relate to a network exposure entity for a wireless communications network, in which a data packet session can be provided between a service provider and a user equipment, the network exposure entity comprising: a module for receiving a user registration request from the service provider for registering one or more users with the wireless communications network in order to execute an authentication of the user equipment, wherein the user registration request comprises an identifier of the service provider, and one or more identifiers of user equipment, for identifying user equipment which can require authentication with the service provider, a module for transmitting a user storage request to a subscriber database, the user storage request comprising the identifier of the service provider, and the one or more identifiers of user equipment.

Furthermore, an embodiment of the invention can relate to a policy control entity for a wireless communications network, in which a data packet session can be provided between a service provider and a user equipment, the policy control entity comprising: a module for receiving an internal authentication request from a network exposure entity for requesting the wireless communications network to execute an authentication of the user equipment with the service provider, a module for authorizing the internal authentication request based on one or more internal criteria, a module for transmitting a message request to a message control entity for sending an authentication message to the user equipment.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

Other devices, systems, methods, features and advantages will be or will become apparent to one with skill in the art upon examination of the following detailed description and figures. It is intended that all such additional systems, methods, features and advantages be included within this description, be within the scope of the invention and be protected by the following claims.

DETAILED DESCRIPTION OF DRAWINGS

Various features of embodiments will become more apparent when read in conjunction with the accompanying drawings. In these drawings:

FIG. 1 schematically illustrates the 5G NR reference architecture as defined by 3GPP;

DETAILED DESCRIPTION OF EMBODIMENTS

Figure 1:
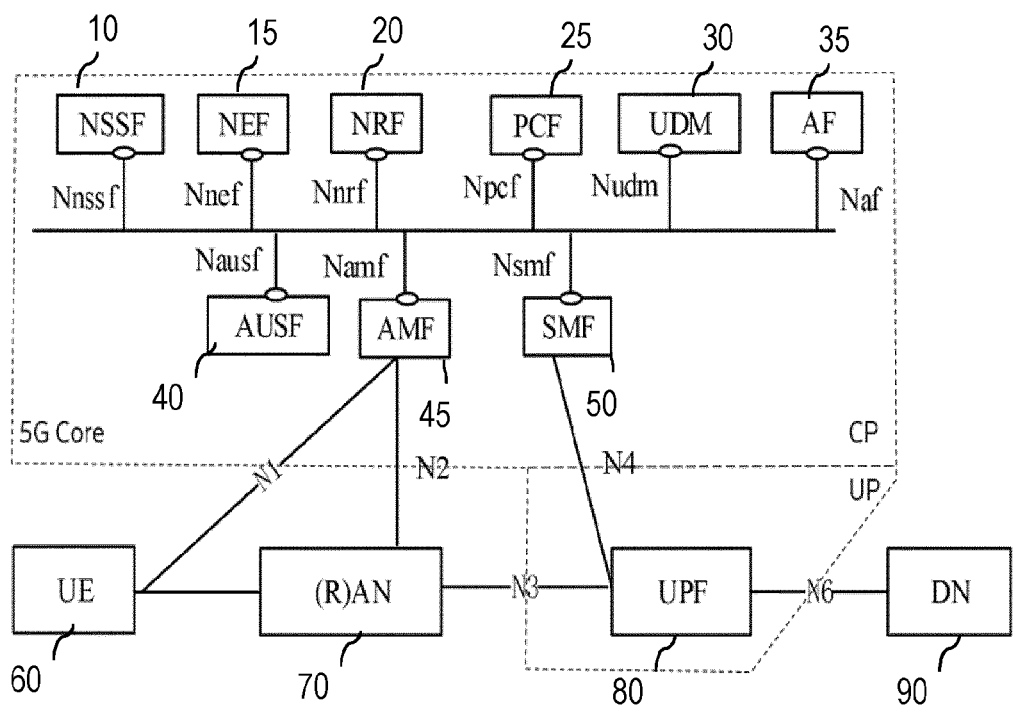

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Figure 2:
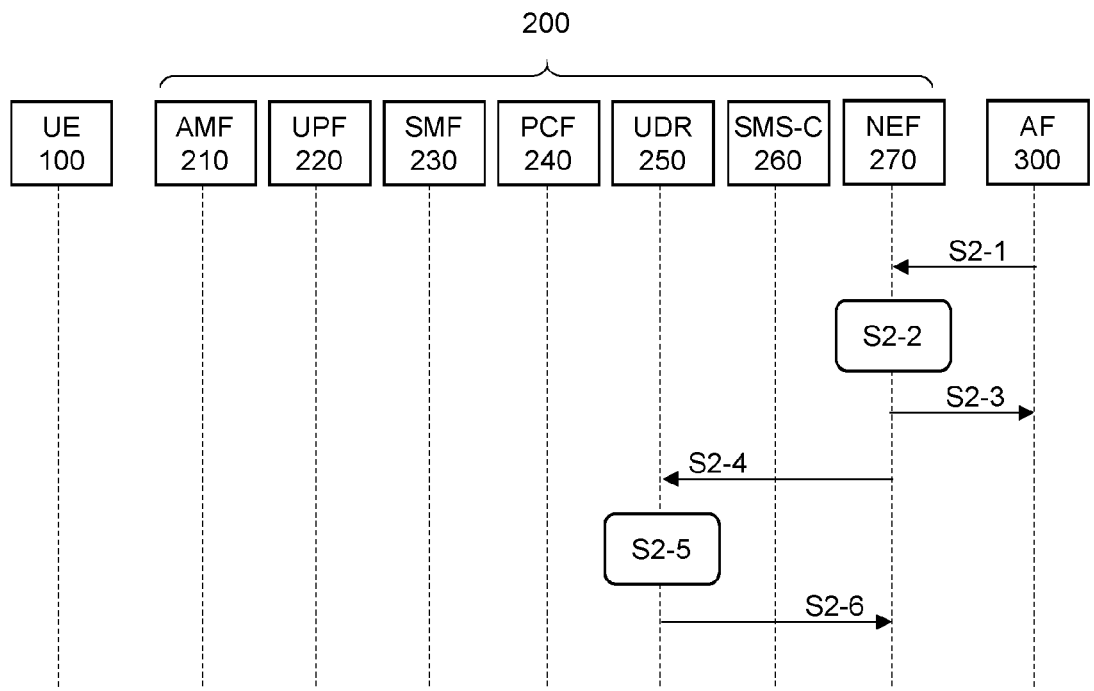
FIGS. 2-4 show example flowcharts of methods carried out by a wireless communications network for implementing a secure authentication.
Figure 3:
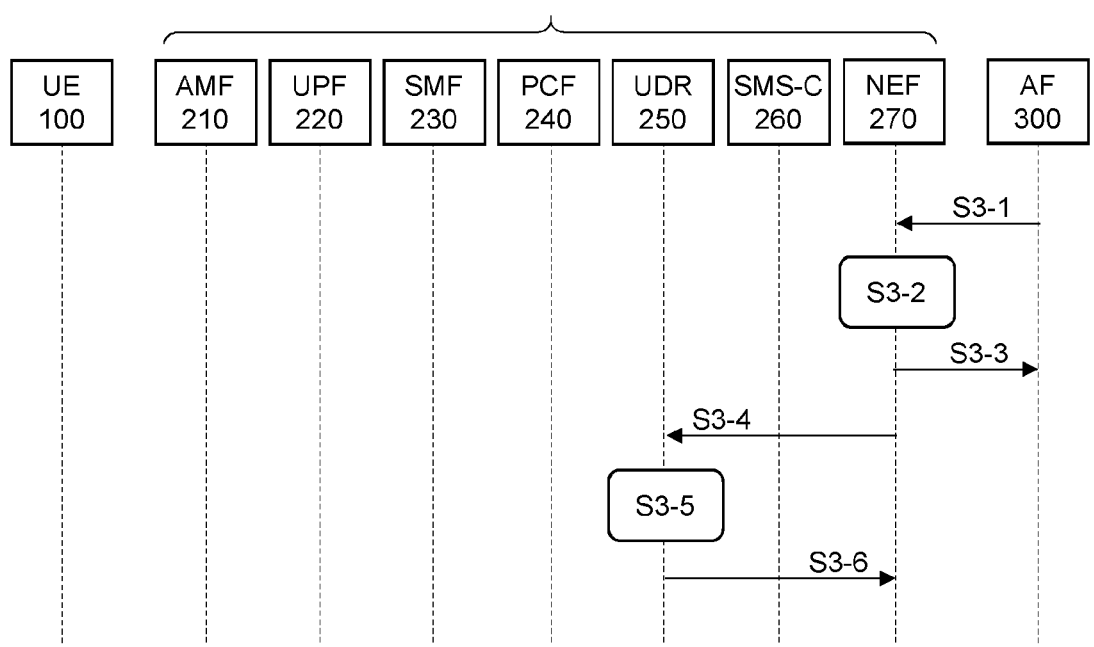

FIGS. 2-4 show example flowcharts of methods carried out by a wireless communications network 200 for implementing a secure authentication.

In some embodiments, the wireless communications network 200 can comprise one or more of the following entities.

The wireless communications network 200 can in particular comprise an access management entity 210, which in the context of a 5G network can be implemented by a Access and Mobility Management Function (AMF), generally handling connection and mobility management tasks with respect to the user equipment 100. In a LTE implementation, the access management entity 210 can be implemented by the MME (Mobility Management Entity).

The wireless communications network 200 can further comprise a user plane entity 220, which in the context of a 5G network can be implemented by a User Plane function (UPF), generally supporting handling of user plane traffic based on the rules received from SMF, specifically, for this IvD, packet inspection (through packet detection rules) and different enforcement actions, e.g. traffic steering, QoS, Charging/Reporting (through FARs, QERs, URRs.

The user plane entity 220 can generally at least support handling of user plane traffic based on the rules received from the session control entity 230. The user plane entity 220 can thus, for instance, carry out packet inspection and different enforcement actions such as QoS, charging, etc., specific to the user equipment 100. In a 5G NR implementation, the user plane entity 220 can be implemented by the UPF (User Plane function). In a LTE implementation, the network user plane entity 220 can be implemented by the PGW-U (User plane of the Packet Data Network Gateway) and/or by the TDF-U (User plane of the Traffic Detection Function).

The wireless communications network 200 can further comprise a session control entity 230, which in the context of a 5G network can be implemented by a Session Management function (SMF), generally supporting different functionality, such as one or more among session establishment, modify and release, and policy related functionalities like termination of interfaces towards policy control functions, charging data collection, support of charging interfaces and control and coordination of charging data collection at user plane entity 220.

The session control entity 230 can generally at least receive PCC (Policy and Charging Control) rules from the policy control entity 240 and configure the user plane entity 220 accordingly. In a 5G NR implementation, the session control entity 230 can be implemented by the SMF (Session Management function). In a LTE implementation, the session control entity 230 can be implemented by the PGW-C (Control plane of the Packet Data Network Gateway) and/or by the TDF-C(Control plane of the Traffic Detection Function).

In the context of the application, the session control entity can generally receive policy and charging control rules, such as PCC rules, from the policy control entity 240 and configure the user plane entity 220 accordingly. In the context of a 5G implementation this can for instance be achieved through a N4 reference point, via a PFCP protocol, as follows.

The session control entity 230 can control the packet processing in the user plane entity 220 by establishing, modifying or deleting PFCP Sessions and by provisioning, for instance by adding, and/or modifying, and/or deleting, any of packet detection rules, FARs, QERs and URRs per PFCP session, whereby a PFCP session may correspond to an individual PDU session or a standalone PFCP session not tied to any PDU session.

Each packet detection rule can contain a PDI specifying the traffic filters or signatures against which incoming packets are matched. Each packet detection rule can be associated to the following rules providing the set of instructions to apply to packets matching the PDI:
  one FAR, which contains instructions related to the processing of the packets, specifically forward, content enrichment, duplicate, drop or buffer the packet with or without notifying the CP function about the arrival of a DL packet,
  zero, one or more QERs, which contains instructions related to the QoS enforcement of the traffic,
  zero, one or more URRs, which contains instructions related to traffic measurement and reporting.

The wireless communications network 200 can further comprise a policy control entity 240, which in the context of a 5G network can be implemented by a Policy Control Function (PCF), generally implementing one or more of the following functionalities:
  supporting unified policy framework to govern network behavior,
  providing policy rules to Control Plane function(s) to enforce them,
  accessing subscription information relevant for policy decisions in a database, such as in a Unified Data Repository (UDR) in the context of 5G.

The policy control entity 240 can generally at least support unified policy framework to govern the behaviour of wireless communications network 200. For instance, the policy control entity 240 can provide PCC (Policy and Charging Control) rules to session control entity 230. In a 5G NR implementation, the policy control entity 240 can be implemented by the PCF (Policy Control Function). In a LTE implementation, the policy control entity 240 can be implemented by the PCRF (Policy and Charging Rules Function).

The wireless communications network 200 can further comprise a subscriber database 250. The subscriber database 250 can generally at least allow storing and retrieving of data, such as policy and/or configuration data. In a 5G NR implementation, the subscriber database 250 can be implemented by the UDR (Unified Data Repository). In a LTE implementation, the subscriber database 250 can be implemented by the SPR (Subscription Profile Repository) as described, for instance, by 3GPP TS 23.203, particularly in FIG. 5.1.1 and the respective description.

The wireless communications network 200 can further comprise a message control entity 260, which in the context of a 5G network can be implemented by a Short Message Service Center (SMS-C), generally capable of sending SMS to the UE 100.

The wireless communications network 200 can further comprise a network exposure entity 270, which in the context of a 5G network can be implemented by a Network Exposure Function (NEF), generally supporting different functionality and in the context of this application can in particular supports functionalities for engaging the wireless communications network 200 in an authentication, such as one or more Exposure APIs.

The network exposure entity 270 can generally at least allow the wireless communications network 200 to communicate with nodes external to the wireless communications network 200, such as the service provider 300, and expose information describing the capabilities and/or configuration of the wireless communications network 200. In a 5G NR implementation, the network exposure entity 270 can be implemented by the NEF (Network Exposure Function). In a LTE implementation, the network exposure entity 270 can be implemented by the SCEF (Service Capability Exposure Function).

The service provider 300, which in the context of a 5G network can be implemented by an Application Function (AF), generally interacting with the wireless communications network 200. In a LTE implementation, the service provider 300 can be implemented by the SCS/AS. In the context of this application, as will become clearer in the following, it allows external parties to use a functionality, such as an exposure APIs, offered by the operator of the wireless communications network 200.

In the following, reference will be made to the service provider 300 as being the entity which requires the authentication. It will however be clear that the invention is not limited thereto and, in some embodiments, the authentication might generate at another entity and it can be transferred through the service provider 300. For instance the authentication requirement might be generated by a banking company and transmitted through an intermediary, such as an authentication provider, acting as service provider 300.

It is understood that any of the user equipment 100, service provider 300, and any of the entities of the wireless communications network 200 can be implemented by hardware, firmware and/or software, alone or in combination with other entities.

The service provider might in particular implement a multi-factor authentication (MFA), encompassing for instance a two-factor authentication or 2FA. This is an electronic authentication method in which a user, here for instance the user operating the user equipment 100, is granted access to a website or application only after successfully presenting two or more pieces of evidence, or factors, to an authentication mechanism. Those might include:
  knowledge, such as something only the user knows,
  possession, such as something only the user has, and
  inherence, such as something only the user is.

Multi-factor authentication protects the user from an unknown person trying to access their data such as personal ID details or financial assets.

Existing solutions for multi factor authentication are commonly based on sending an SMS with a pin code, but this is not secure enough, for instance in case of a malicious user having a duplicate SIM card or registering an application with a PUI (MSISDN) different to the one corresponding to the PDU session established.

Embodiments of the invention propose mechanisms which improve on this technology and generally allow the definition of a new interface, such as a Nnef API in the context of a 5G implementation, which allows a service provider 300 to request authentication through the wireless communications network 200, preferably on a per user and/or per application basis. That is, embodiments of the invention allow the implementation of a service level agreement between a service provider 300 and a mobile network operator relative to multi factor authentication.

The methods illustrated in FIGS. 2-4 represent a possible behaviour of several of the entities described above. As it will become clear from the following description, the invention does not necessarily need all the entities nor all the steps illustrated in FIGS. 2-4 to be implemented. Nevertheless, for clarity of explanation, all steps will be described in their chronological order.

In particular, FIG. 2 generally describes an onboarding procedure allowing the service provider 300 to register itself with the wireless communications network 200. Generally, the network exposure entity 270 can produce/expose a new service allowing the service provider 300 to register for multi-factor authentication services with the wireless communications network 200. In the context of a 5G implementation, the service can be understood as a 5GC NF Service Producer implemented by a new Nnef API supporting the operations illustrated in FIGS. 2-4. Throughout the following description, this service can be referred to as Nnef_MFA.

In the onboarding illustrated in FIG. 2, the service provider 300 can generally trigger an onboarding request to the mobile network operator, for instance through the network exposure entity 270, related to multi factor authentication, by triggering a message, which can be referred to as Nnef_MFA_Onboarding request message in the following, including one or more of the following parameters:
  AF-ID: identifies the service provider 300, for instance a banking company,
  List of App-ID: identifies one or more application/s, for instance a banking app.

Through this procedure, the service provider 300 can thus generally requests the mobile network operator to create an association between the service provider 300 and the mobile network operator, or the wireless communications network 200, relative to multi-factor authentication.

Figure 6:
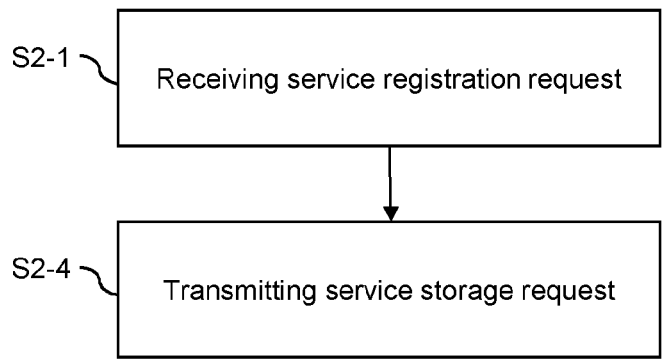

In particular, as visible in FIG. 6, an embodiment can relate to a method for operating a network exposure entity 270 in a wireless communications network 200, in which a data packet session can be provided between a service provider 300 and a user equipment 100. The method can comprise a step S2-1 of receiving, at the network exposure entity 270, a service registration request from the service provider 300 for registering with the wireless communications network 200 in order to execute an authentication of the user equipment 100.

The service registration request can comprise an identifier of the service provider 300, and one or more application identifiers, for identifying applications which can require authentication of the user equipment 100.

The method can further comprise a step S2-2, at which the network exposure entity 270 authorizes the onboarding request, for instance including verification, based on the service level agreement, for the service provider to be authorized to onboard relative to multi-factor authentication service for the requested applications.

The method can further comprise a step S2-3, with which a response message is sent from the network exposure entity 270 to the service provider 300, indicating successful operation.

The method can further comprise a step S2-4 of transmitting a service storage request to a subscriber database 250, the service storage request comprising the identifier of the service provider 300, and the one or more application identifiers. This allows storing those information at the subscriber database 250 for subsequent use.

The method can further comprise a step S2-5, at which the information is stored at the subscriber database 250 and a step S2-6 at which a confirmation is sent from the subscriber database 250 to the network exposure entity 270.

Through the method illustrated in FIG. 2 it is thus possible to store in the wireless communications network 200 information identifying the service provider 300 and one or more services, or applications, associated with the service provider 300.

With reference to a 5G implementation, and using pseudo-code, one possible implementation of the steps S2-1 to S2-5 could also be indicated as:

S2-1: Nnef_MFA_Onboarding Request including {AF-ID, service=Nnef_MFA, list of App-ID (example-.com)}

S2-2: NEF authorizes the requests and takes action to store in the UDR as AppData an indication of the AF (AF-ID) onboarded relative to MFA for the application/s S2-3: response S2-4: Nudr_Store Request including {list of App-ID, Nnef_MFA, AF-ID}

S2-5: NEF UDR stores (e.g. as AppData) the information received

S2-6: response

FIG. 3 generally describes a user registration procedure allowing the service provider 300 to register one or more users with the wireless communications network 200. Generally, the service provider 300 can trigger a user registration request to mobile network operator, through the network exposure entity 270, related to multi-factor authentication, by triggering a request message, which can be referred to as Nnef_MFA_UserRegistration in the following description, including one or more of the following parameters:

AF-ID: identifies the service provider 300, for instance a banking company,

List of App-ID: identifies the one or more application/s, for instance a banking app, list of External-User-Identity: identifies the one or more user/s, for instance a public mobile phone number, preferably as PUI/MSISDN.

Through this procedure, the service provider 300 can thus request the mobile network operator to register the one or more users relative to multi-factor authentication, preferably on a per application/s basis. It will be clear that, in some embodiments, the user registration request can also implement the functionalities previously described for the onboarding request.

Figure 7:
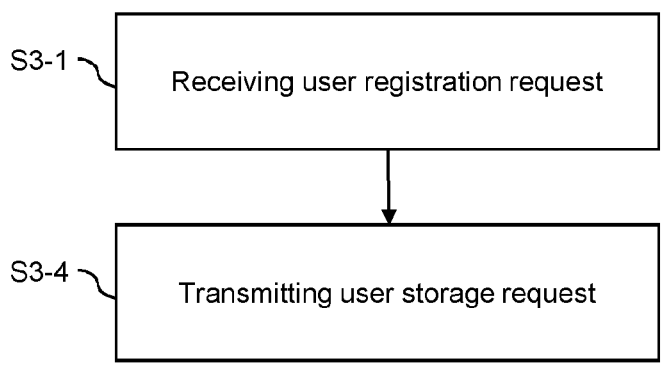

In particular, as visible in FIG. 7, an embodiment can relate to a method for operating a network exposure entity 270 in a wireless communications network 200, in which a data packet session can be provided between a service provider 300 and a user equipment 100.

The method can comprise a step S3-1 of receiving a user registration request from the service provider 300 for registering one or more users with the wireless communications network 200 in order to execute an authentication of the user equipment 100. The user registration request can comprise an identifier of the service provider 300, and one or more identifiers of user equipment 100, for identifying user equipment 100 which can require authentication with the service provider 300.

The method can further comprise a step S3-2, at which the network exposure entity 270 authorizes the registration request, for instance including verification, based on the service level agreement, for the service provider to be authorized to onboard relative to multi-factor authentication service for the requested applications and/or users. The method can also further comprise a step S3-3, with which a response message is sent from the network exposure entity 270 to the service provider 300, indicating successful operation.

In some embodiments, preferably when the user registration is carried out after the onboarding request, the step S3-2 can also comprise verification for a previous successful onboarding for the service provider, for instance identified by the AF-ID, and/or for the requested one or more applications. Alternatively, or in addition, the step S3-2 can also comprise verification for the one or more user to be subscriber in the wireless communications network 200.

The method can further comprise a step S3-4 of transmitting a user storage request to a subscriber database 250, the user storage request comprising the identifier of the service provider 300, and the one or more identifiers of user equipment 100.

In some embodiments, the user registration request and the user storage request can further comprise one or more application identifiers, for instance the previously described App-ID, for identifying applications which can require authentication of the user equipment 100.

In some embodiments, the identifier of the user equipment 100 can comprise one or more of an IP address of the user equipment 100 and/or a phone number of the user equipment 100, for instance the previously described external user identity.

The method can further comprise a step S3-5, at which the information is stored at the subscriber database 250 and a step S3-6 at which a confirmation is sent from the subscriber database 250 to the network exposure entity 270.

Through the method illustrated in FIG. 3 it is thus possible to store in the wireless communications network 200 information identifying the service provider 300 and one or more users for which the service provider 300 can request multi-factor authentication through the wireless communications network 200.

In some cases, the method of FIG. 3 can also be used to record services, or applications, associated with the service provider 300 and with the users. in case those services, or applications have been previously registered, through an onboarding request such as described in FIG. 2, the previous registration can be used during the method of FIG. 3 as a check for confirmation of the validity of the user registration request, for instance by confirming identity of the services, or applications received via the user registration with the services, or applications previously received via the onboarding request. Alternatively, or in addition, in case of lack of identity, the services, or applications received via the user registration can overwrite those previously received via the onboarding request. Still alternatively, or in addition, the services received via the user registration can be a subset of, or corresponding to, the services, or applications previously received via the onboarding request and, in the user registration request, but can further be associated to the users, for instance by associating one or more services to one or more users, so that not all users are registered for the same services.

With reference to a 5G implementation, and using pseudo-code, one possible implementation of the steps S3-1 to S3-5 could also be indicated as:

S3-1: Nnef_MFA_UserRegistration Request including {AF-ID, service=Nnef_MFA, list of App-ID (example.com), list of External-User-Identity}

S3-2: NEF authorizes the requests and takes action to store in the UDR an indication of the users registered for MFA for the application/s S3-3: response S3-4: Nudr_Store Request including {list of External-User-Identity, list of App-ID, Nnef_MFA, AF-ID}

S3-5: NEF UDR stores the information received

S3-6: response

Figure 4A:
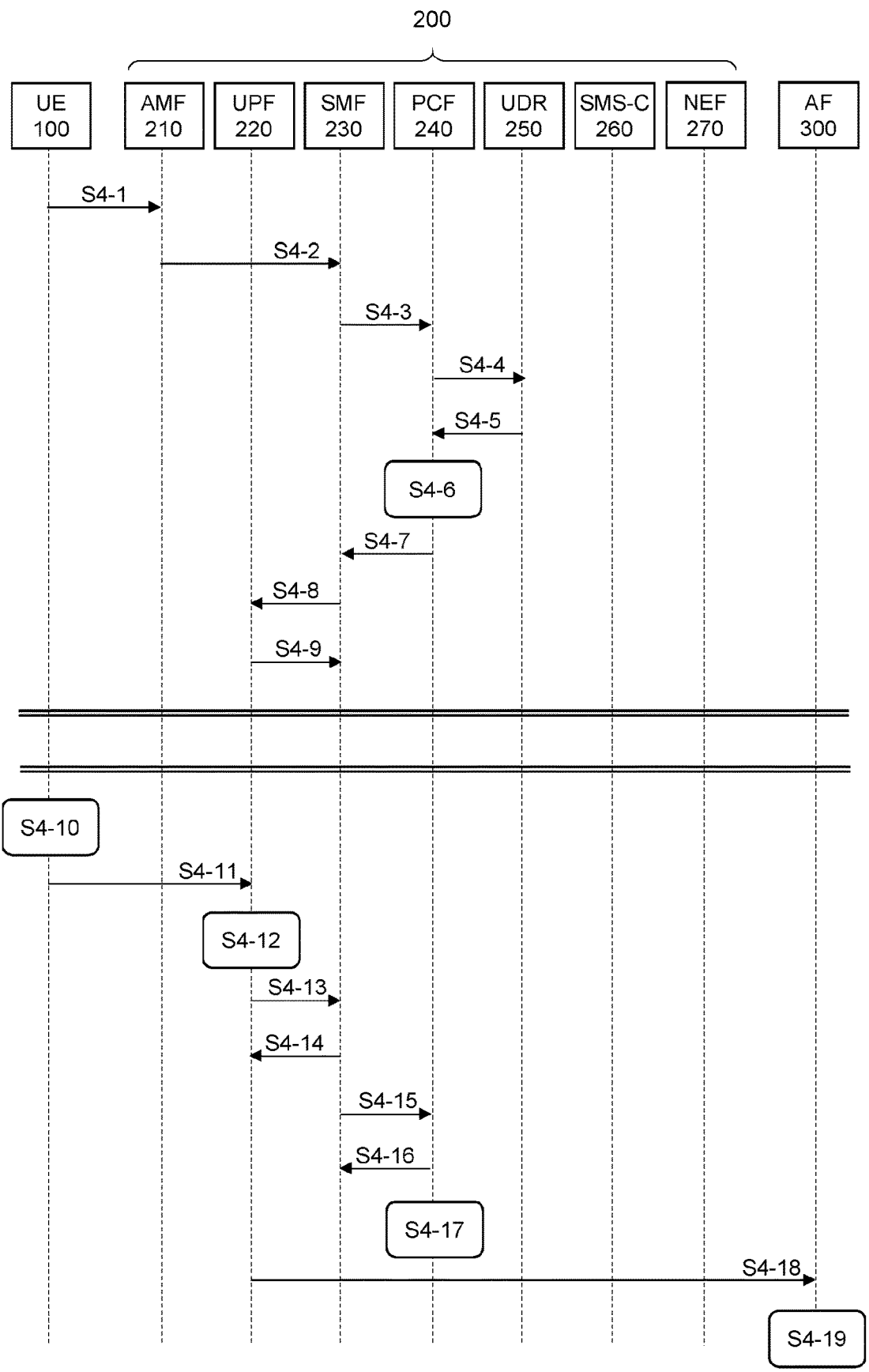
Figure 4B:
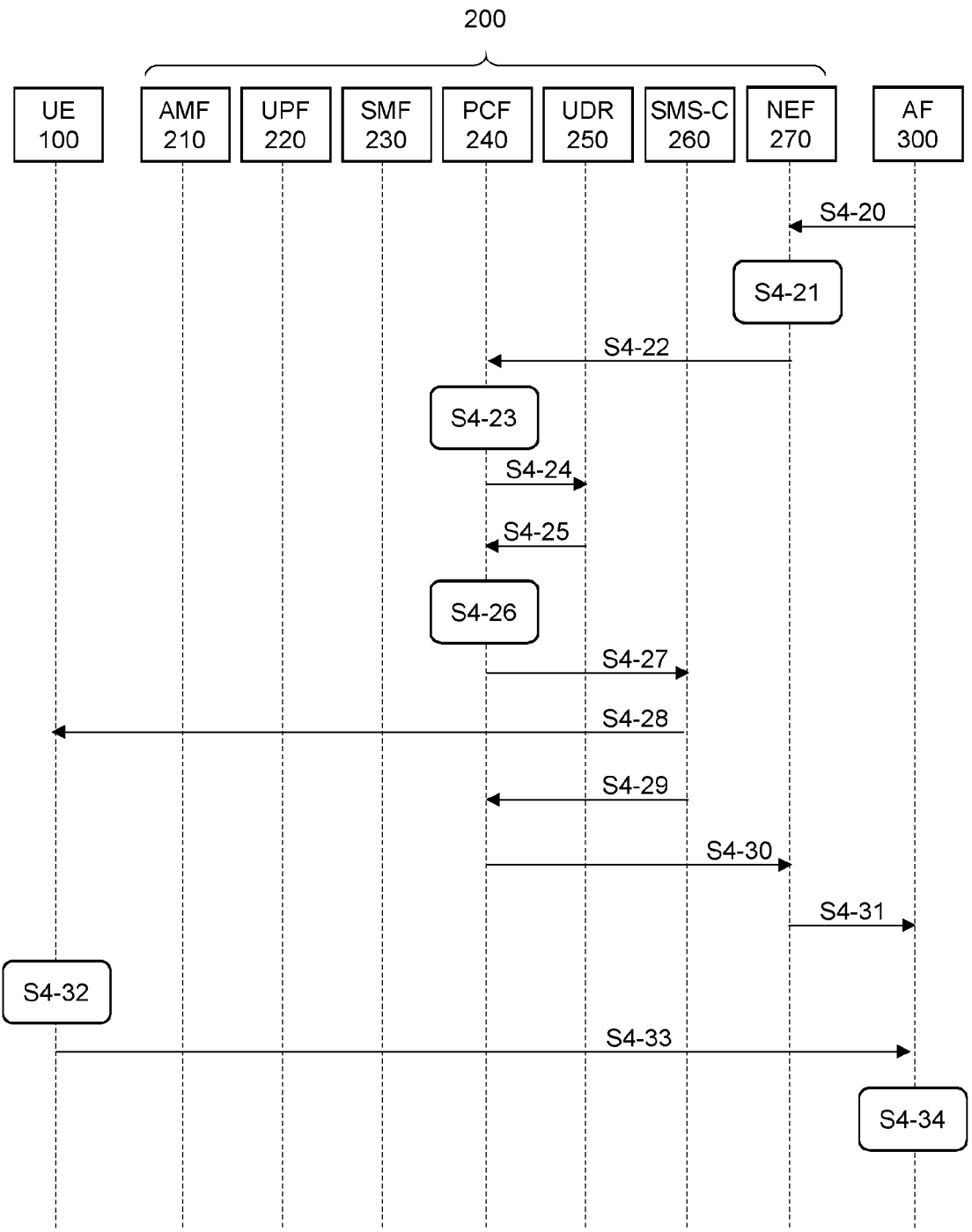

FIGS. 4A and 4B generally describe a method for user authentication.

In general, steps S4-1 to S4-9 relate a session establishment of the user equipment 100 with the wireless communications network 200. Still in general, steps S4-10 to S4-34 relate to an authentication of the user equipment 100 with service provider 300 through the wireless communications network 200. It will be clear that further steps might be present in practical implementations and in particular between steps S4-9 and S4-10. It will also be clear that, as will be described more in details in the following, not all steps need to be carried out for the invention to be implemented.

The operation illustrated in FIGS. 4A-4B generally allows the service provider 300 to request a user authentication, through a multi-factor authentication procedure, to the network operator, that is, to the wireless communications network 200, to authenticate the user of the user equipment 100, preferably on a per application/s basis.

At a step S4-1, the user equipment 100 triggers a PDU session establishment procedure by sending a session establishment request to the access management entity 210. This request is forwarded by the access management entity 210 to the session control entity 230 at step S4-2. At step S4-3, the session control entity 230 creates a policy association with the policy control entity 240 by transmitting a policy request.

At step S4-4, the policy control entity 240 requests the subscriber policy associated to the user and/or to the user equipment from the subscriber database 250, for instance based on the SUPI, by transmitting an applications request. Alternatively, or in addition, at this step, the policy control entity 240 can further request application data, which can comprise an indication of a user being registered to authentication for a given application. For instance, with reference the previous description, it can be indicated whether the user equipment 100 is registered for authentication with the service provider 300, that is, whether the user equipment 100 is registered for authentication with the App-ID. This information can be previously stored in the subscriber database 250, for instance by means of the method described in FIG. 3.

At step 4-5 the policy control entity 240 retrieves the requested data by receiving applications identifiers. At step S4-6 the policy control entity 240 generates policies, such as policy and charging control rules in the context of a 5G implementation. In some cases, a rule can be generated to applications corresponding to the service provider, and/or to the App-ID, with application start, and optionally also stop, event. At step S4-7 the policies are forwarded to the session control entity 230.

At step S4-8 the session control entity 230 triggers a response to the user plane entity 220, for instance a PFCP Session Establishment procedure, to indicate packet detection rules based on the policy rules received from the policy control entity 240. In some embodiments, the response might also comprise the corresponding enforcement actions, such as any of FARs, QERs, URRs, etc. for the PDU session. In some embodiments, a packet detection rule can thus be generated for packets between the user equipment 100 and the service provider 300, and/or for packets associated with an App-ID as retrieved from the subscriber database 250. In some cases, a usage reporting rule can associated to the packet detection rule, requesting application start, and optionally also stop, event can be included. At step S4-9 a session establishment response can be sent.

Thanks to this procedure it is therefore generally possible to check whether the user equipment 100 is registered for an authentication with the service provider 300, optionally also indicating for which application the registration is valid. When a user equipment 100 establishes a session with the wireless communications network 200, if it is deemed that the user equipment 100 is indeed registered for a given service provider 300 and/or one or more applications thereof, the user plane entity 220 can be informed of the registration. As will become clearer in the following, this allows the user plane entity 220 to recognize traffic associated to the given service provider 300 and/or one or more applications thereof, for which an authentication might be provided.

At step S4-10 a user opens an application on the user equipment, which, at step S4-11 causes application data to be exchanged between the user equipment 100 and the user plane entity 220.

Thanks to the previous configuration of the user plane entity 220, at step S4-12 the user plane entity 220 can recognize the application, for instance based on the App-ID or a similar application identifier. At step S4-13, the user plane entity 220 notifies an application start event towards the session control entity 230, for instance by triggering a PFCP Session Report Request including the application start event for the given application identifier, such as App-ID. At step S4-14 a confirmation is received from the session control entity 230.

At step S4-15, having been informed of the traffic with the given application, the session control entity 230 forwards the application identification to the policy control entity 240. In the context of a 5G implementation, for instance, this can be achieved by triggering a Npcf_SMPolicyControl_Update Request including the application start event for App-ID. At step S4-16 a confirmation is received from the policy control entity 240.

At step S4-17, having been informed of the traffic with the given application, the policy control entity 240 stores information indicating that the given application is active for the session. As will become clearer from the following, this advantageously subsequently enables the policy control entity 240 to check whether an authentication request is to be validated or not, thus increasing security of the authentication.

At step S4-18 the service provider 300 receives application traffic requesting user authentication, for instance username and password, as one factor authentication. Although in the illustrated embodiment this data might correspond directly to the data exchanged at step S4-11, the present invention is not limited thereto and the data of step S4-18 might actually be different from the data exchanged at step S4-11. At step S4-18, the service provider 300 recognizes the authentication need, and/or the authentication request from the user equipment 100, and starts the authentication procedure.

In particular, as can be seen in FIG. 4B, at step S4-20, the service provider 300 can send an external authentication request to the network exposure entity 270. In the context of a 5G application and/or throughout the rest of the description, this message could be indicated as a Nnef_MFA_User-Authentication Request message. This message could include any of the following parameters:
- AF-ID: identifying the service provider 300, requesting the authentication,
- one or more App-ID: identifying one or more application requesting the authentication,
- External-User-Identity: identifying the user of the user equipment 100, for instance a public mobile phone number such as PUI/MSISDN,
- IP address of the user equipment 100, that is, the IP address of the user equipment 100 seen by the service provider 300,
- authentication-Information: any information relative to the authentication requested by the service provider 300, for instance an indication to the wireless communications network 200 to send a message, such as for instance an SMS, towards the user equipment 100. As will become clearer from the following description, the message can be provided with a pin code generated by the wireless communications network 200, in which case this is preferably also forwarded to the service provider 300, or generated by the service provider 300 and preferably forwarded with the message at step S4-20. Alternatively or in addition, the message towards the user might include a question, such as the pet name. The message to the user might be sent through an SMS, as will be described more in details in the following, the present invention is however not limited thereto and the wireless communications network 200 might be requested by the service provider 300 to trigger a different type of message towards the user, such as an E-mail, a OS or application Push notification, etc. The authentication-information might also further include one or more allowed user locations, indicating locations of the users allowed for running user authentication for the application.

Thanks to the content of the message exchanged at step S4-20, the wireless communications network 200 is thus made aware of the request to authenticate the user equipment 100.

At a step S4-21, the network exposure entity 270 authorizes the external authentication request. The authorization generally comprises one or more checks run by the network exposure entity 270 to generally confirm the request is allowable. For instance, it might include verification for a previous successful onboarding for the given service provider 300, such as described with reference to FIG. 2. Alternatively, or in addition, the application requesting the authorization might be checked against a previously registered application, for instance through App-ID, such as described with reference to FIG. 2 and FIG. 3. Alternatively, or in addition, it might be checked that the user for which authorization is requested is a validly registered subscriber of the wireless communications network 200 and/or has been registered for the authentication, such as described with reference to FIG. 3. Still alternatively, or in addition, the application requesting the authorization might be checked to be validly registered for the given user. In this manner the wireless communications network 200 can make it more complex to create a false authentication request.

At a step S4-22 the network exposure function 270 forwards to the policy control entity 240 the user authentication in form of an internal authentication request. In the context of a 5G application and/or throughout the description, this message might also be referred to as a Npcf_MFA_UserAuthentication request message. The internal authentication request might comprise one or more of the fields provided in the external authentication request of step S4-20 above.

At a steps S4-23 the policy control entity 240 can optionally run various checks to further validate the internal authentication request and, if validated, at step S4-24 it can transmit a registration request to the subscriber database 250. The registration requests generally allows retrieving from the subscriber database 250 information relative to the authentication for the given application and/or for the given user. For instance, a policy request message can be sent to the subscriber database 250 including any of the SUPI and/or App-ID as input parameters.

At step S4-25 the subscriber database 250 can provide the requested data in form of a registration data message. This message might comprise any of the following parameters:
- an indication of the user registered for authentication for the given application,
- an indication of the user consent for authentication for the application,
- an association between any of the PUI/MSISDN, SUPI/IMSI and PEI/IMEI for authentication for the given application. in some embodiments, this information might optionally correspond to the last successful user authentication procedure.

At step S4-26) the policy control entity 240 can generally further authorize the internal authentication request. Depending on the implementation, this might comprise any of the following:
- the policy control entity 240 verifies the user is registered for authentication, for instance as described in combination with FIG. 3, optionally also checking the user is registered for the requested application, indicated for instance by App-ID,
- the policy control entity 240 verifies user consent for authentication, optionally for the requested application,
- the policy control entity 240 verifies the user has an active PDU session,
- the policy control entity 240 verifies the IP-Address of the user equipment 100, provided with the internal authentication request, corresponds to the active PDU session for the user equipment 100,
- the policy control entity 240 verifies the External-User-Identity, for instance the mobile phone of the user, matches with the PUI/MSISDN for the active PDU session,
- the policy control entity 240 verifies a correct association between any of the PUI/MSISDN, that is, the mobile phone number, SUPI/IMSI, that is, the subscriber identifier and PEI/IMEI, that is, the device identifier, for the given user equipment 100, preferably on a per-application basis. In case there is a mismatch, for instance a previous user authentication was done from a different device, the policy control entity 240 can invalidate the user authentication procedure. This can be advantageously used to avoid the scenario of SIM duplication, the policy control entity 240 verifies the user equipment 100 is currently running the requested application, for instance identified by App-ID included in authentication request, by means of the previously received application start event, described with reference to Step S416 above.

additional checks can be performed, for instance based on the digital footprint of the browser, for instance it might be verified there is a match with previous user authentication procedures.

If the verifications run by the policy control entity 240 are executed successfully, the policy control entity 240 can validate the user authentication procedure and store in the subscribed database 250 the association between any of the PUI/MSISDN, SUPI/IMSI and PEI/IMEI device for authentication for the application. This information can be advantageously used for subsequent user authentication procedures, for instance to verify they are executed from the same device.

It is thus evident how the plurality of checks which can be run by the various entities of the wireless communications network 200 enables an increase level of security in the authentication, which makes it much harder to tamper with an authentication process between the service provider 300 and the user equipment 100.

At step S4-27, preferably based on the authentication-Information, the policy control entity 240 can transmit triggers a message request message, for requesting the wireless communications network to send an authentication message to the user equipment 100. In the case of a SMS-based implementation, such as the one illustrated in FIG. 4B, this can be done by sending a message to a message control entity 260, for instance a SMS-C in the context of a 5G implementation. The message can include any of the following parameters:

destination, such as PUI, and text, for instance comprising the PIN and/or the secret question previously described.

In some embodiments, the text can be generated by the policy control entity 240 based on Authentication-Information. For instance if the service provider indicated a PIN in the Authentication-Information, the message text might then include it.

Alternatively. or in addition, preferably if requested by the authentication-Information, the policy control entity 240 might generate a temporary pin code to be included in the message. In this case, the policy control entity 240 can also provide the same PIN to the service provider 300, preferably through the network exposure entity 270, for instance through steps S4-30, which will be described later, or through an additional step, not illustrated. Alternatively or in addition, the message to the user might include a question, such as the favorite pet name.

At step S4-28 the message control entity 260 triggers a message towards the user, preferably a SMS message, including the text requested by the policy control function 240. As previously described, instead of a SMS, the policy control entity 240 might trigger a different type of message towards the user, such as for instance an E-mail, an OS or app Push notification, etc. Optionally, authentication-Information might also include allowed user location/s when running user authentication for the application. At step S4-29, after successful delivery to the end user, the message control entity 260 triggers a response message to the policy control entity 240 including an indication of successful delivery. At step S4-30, the policy control entity 240 answers the message in step S4-22, by triggering an internal authentication response. For instance, in the context of a 5G implementation and throughout the description, this might be referred to as a Npcf_MFA_UserAuthentication message, indicating successful operation and optionally including Authentication-Result, for instance the pin code in case Authentication-Information requested the wireless communications network 200 to generate it, as previously described. Similarly, at step S4-31, based on the above, the network exposure entity 270 answers the message from step S4-20, by triggering am external authentication response toward the service provider 300. In the context of a 5G implementation and throughout the description, this might be referred to as a Nnef_MFA_UserAuthentication response message.

This message indicates successful operation and optionally including authentication-Result, such as the previously described pin code in case authentication-Information requested the mobile network operator to generate it.

Thanks to the above, the user equipment 100 can thus be provided with the information necessary for the authentication in a secure manner.

At steps S4-32 the user receives the message allowing authentication. Authentication can then proceed in a customary manner, for instance by entering the requested data, such as the PIN code, through the application client to complete the user authentication procedure. This is sent at step S4-33 and at step S4-34 the service provider 300 authenticates the user.

With reference to a 5G implementation, and using pseudo-code, one possible implementation of the steps S4-1 to S4-32 could also be indicated as:

S4-1: PDU Session Establishment Request
S4-2: Nsmf_PDUSession_CreateSMContext Request
S4-3: Npcf_SMPolicyControl_Create Request
S4-4: UDR policy request including {SUPI}
S4-5: UDR policy response including {Subscriber Data and Application Data, including an indication of subscriber registered to MFA for App-ID (example.com)}
S4-6: PCF generates PCC Rules (including a PCC Rule for the App-ID=example.com, with application start event)
S4-7: Npcf_SMPolicyControl_Create Response including {PCC Rules, including a PCC Rule for the App-ID=example.com, with application start event}
S4-8: PFCP Session Establishment Request including {PDRs/FARs/QERs/URRs, including PDR (App-ID=example.com), URR (application start event)}
S4-9: PFCP Session Establishment Response
S4-10: User opens an application (example.com)
S4-11: application traffic
S4-12: UPF detects application (App-ID=example.com) and reports application start event
S4-13: PFCP Session Report Request including {Application start event (App-ID=example.com)}
S4-14: Response
S4-15: Npcf_SMPolicyControl_Update Request including {Application start event (App-ID=example.com)}
S416: Response
S4-17: PCF stores that App-ID=example.com is active for the session
S4-18: Application traffic
S4-19: Application server requests user authentication and triggers MFA
S4-20: Nnef_MFA_UserAuthentication Request including {AF-ID, service=Nnef_MFA, App-ID=(example.com), External-User-Identity, UE-IP-Address, Authentication-Information}

S4-21: NEF authorizes the request
S4-22: Npcf_MFA_UserAuthentication Request including {AF-ID, service=Nnef_MFA, App-ID=(example.com), External-User-Identity, UE-IP-Address, Authentication-Information}
S4-23: PCF authorizes the request and retrieves from UDR the information relative to MFA for App-ID=example.com
S4-24: UDR Policy Request including {SUPI, App-ID=example.com}
S4-25: UDR Policy Response including {Subscriber Data and Application Data, including an indication of subscriber registered to MFA for App-ID (example.com), user consent for App-ID (example.com), PUI/SUPI/PEI association}
S4-26: PCF applies the verification procedure and triggers SMS towards the user (based on Authentication-Information)
S4-27: SMS Request including {PUI, SMS text}
S4-28: SMS message including {SMS text}
S4-29: SMS response including {indication of SMS successful delivery}
S4-30: Npcf_MFA UserAuthentication Response including {Authentication-Result}
S4-31: Nnef_MFA UserAuthentication Response including {Authentication-Result}
S4-32: User receives SMS and enters the requested data to complete the user authentication procedure
S4-33: Application traffic
S4-34: Application Server, after successful MFA, grants user the right to use the application.

While the above description of FIGS. 4A and 4B has been provided with a plurality of steps, and in a specific order, it will be clear that not all those steps are required for implementing the invention.

Figure 5:
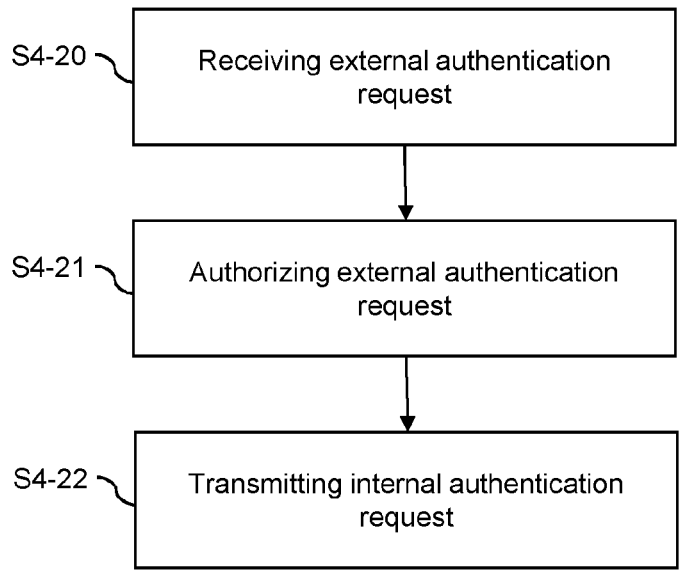
FIGS. 5-7 show example flowcharts of methods carried out by a network exposure entity for implementing a secure authentication.

As illustrated in FIG. 5, an embodiment of the invention can in particular relate to a method for operating a network exposure entity 270 in a wireless communications network 200, in which a data packet session can be provided between a service provider 300 and a user equipment 100. The method can comprise a step S4-20 of receiving an external authentication request from the service provider 300 for requesting the wireless communications network 200 to execute an authentication of the user equipment 100 with the service provider 300. The external authentication request can comprise at least an identifier of the user equipment 100, and an authentication identifier for indicating to the wireless communications network 200 how to execute the authentication. It will be clear that further content of the external authentication request can be derived from the previous description, for instance with reference to the previously described authentication-Information.

The method can further comprise a step S4-21 of authorizing the external authentication request based on one or more external criteria, wherein the one or more external criteria can comprise whether the user equipment 100 is registered in the wireless communications network 200. Further criteria can correspond to any of the criteria previously described with reference to FIG. 4B.

The method can further comprise a step S4-22 of transmitting an internal authentication request to a policy control entity 240, wherein the internal authentication request can be configured to cause the wireless communications network 200 to perform the authentication in accordance with the authentication identifier.

In some embodiments, the authentication identifier can indicate an SMS-based authentication, as illustrated for instance in the embodiment of FIGS. 4A and 4B. In this case, the internal authentication request can cause the wireless communications network 200 to send an authentication SMS to the user equipment 100, preferably as previously described.

In some embodiments, the external authentication request, the internal authentication request and the SMS can further comprise a security code for the authentication, for instance the previously described PIN code.

In some embodiments the method can further comprise a step S4-30 of receiving an internal authentication response from the policy control entity 240, in response to the internal authentication request, indicating successful delivery of the authentication SMS, and a step S4-31 of transmitting an external authentication response to the service provider 300, in response to the external authentication request, indicating successful delivery of the authentication SMS.

In some embodiments, the external authentication request can further comprise an identifier of the service provider 300, for instance the previously described AF-ID, and the method can further comprise the step S2-1 of receiving a service registration request from the service provider 300, wherein the service registration request comprises an identifier of a service provider 300. The one or more external criteria can then further comprise whether the identifier of the service provider 300 received at step S4-20 with the external authentication request corresponds to the identifier of the service provider 300 previously received at step S2-1 with the service registration request. In case of a positive correspondence, the criteria can be considered as fulfilled.

In some embodiments the method can further comprise the step S3-1 of receiving a user registration request from the service provider 300, wherein the user registration request comprises an identifier of a user equipment 100, for instance the previously described IP address and/or telephone number. The one or more external criteria can then further comprise whether the identifier of the user equipment 100 received at step S4-20 with the external authentication request corresponds to the identifier of the user equipment 100 previously received at step S3-1 with the user registration request. In case of a positive correspondence, the criteria can be considered as fulfilled.

Figure 8:
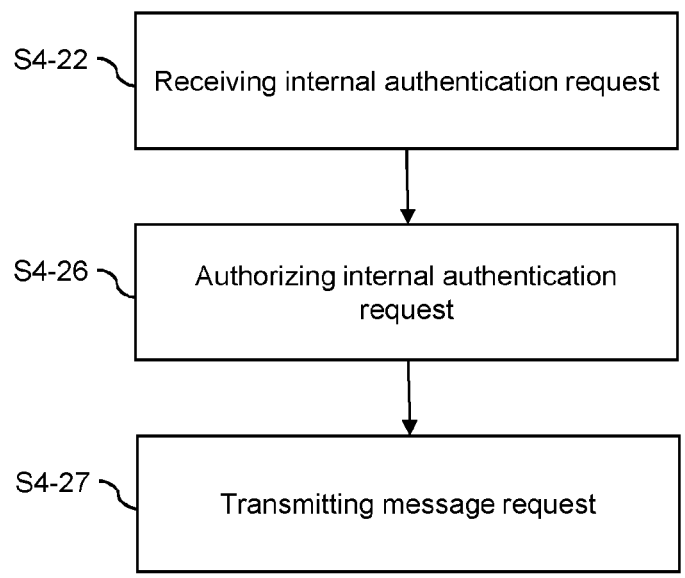
FIG. 8 shows an example flowchart of a method carried out by a policy control entity for implementing a secure authentication.

As illustrated in FIG. 8, an embodiment of the invention can in particular relate to a method for operating a policy control entity 240 in a wireless communications network 200, in which a data packet session can be provided between a service provider 300 and a user equipment 100. The method can comprise a step S4-22 of receiving an internal authentication request from a network exposure entity 270 for requesting the wireless communications network 200 to execute an authentication of the user equipment 100 with the service provider 300, and a step S4-26 of authorizing the internal authentication request based on one or more internal criteria. The internal criteria can be any of the criteria previously described with reference to FIG. 4B. The method can further comprise a step S4-27 of transmitting a message request to a message control entity 260 for sending an authentication message to the user equipment 100.

In some embodiments, the one or more internal criteria can in particular comprise whether the user equipment 100 has an active data packet session in the wireless communications network 200. In some embodiments, the internal authentication request can comprise a phone number, and the one or more internal criteria can comprise whether the phone number corresponds to a phone number of the user equipment 100. In some embodiments, the internal authentication request can comprise an IP address, and the one or more internal criteria can comprise whether the IP address corresponds to an IP address of the user equipment 100. In some embodiments, the one or more internal criteria can comprise whether an association between at least two among the following data has not changed with respect to a previous authentication:

International Mobile Equipment Identity of the user equipment 100, phone number of the user equipment 100, subscriber information associated by the wireless communications network 200 to the user equipment 100.

In some embodiments, the method can further comprising the step S4-15 of receiving an application identifier from a session control entity 230 for indicating execution of an application at the user equipment 100 and the internal authentication request can comprise an application identifier. The one or more internal criteria can then comprise whether the application identifier received at step S4-22 with the internal authentication request corresponds to the application identifier received at step S4-15 from the session control entity 220.

in some embodiments the method can further comprise a step S4-25 of receiving registration data from a subscriber database 250, the registration data comprising one or more application identifier and one or more subscriber identifier, and the internal authentication request can comprise an application identifier. The one or more internal criteria can then comprise whether the application identifier received at step S4-22 with the internal authentication request corresponds to the application identifier received at step S4-25 from the subscriber database 250.

In some embodiments the method can further comprise a step S4-3 of receiving from a session control entity 230 a policy request associated with the user equipment 100, and steps S4-4, S4-5 of retrieving from a subscriber database 250 one or more application identifiers, for identifying applications which can require authentication of the user equipment 100. The method can additionally comprise a step S4-6 of generating policies for the user equipment 100 indicating that execution of the one or more applications is to be notified to the wireless communications network 200, and a step S4-7 of transmitting the policies to a session control entity 230.

Figure 9:
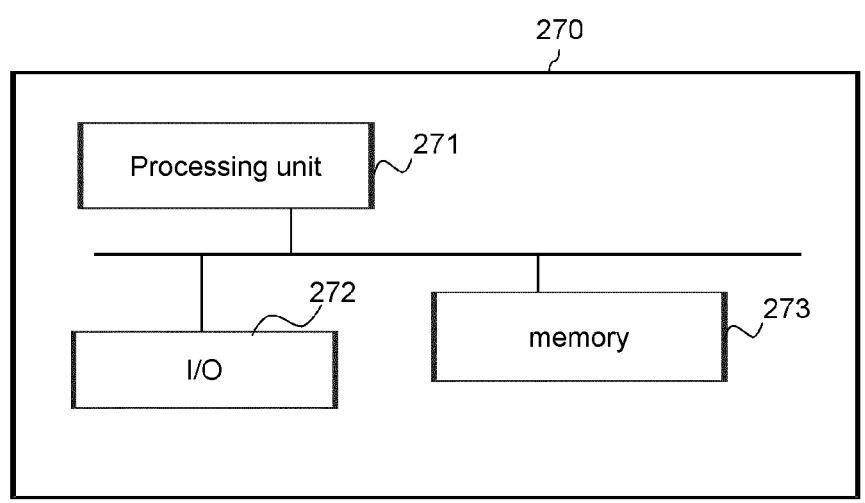
FIG. 9 shows an example schematic of a network exposure entity configured for implementing a secure authentication.

Additionally, as visible in FIG. 9, further embodiments of the invention can relate to a network exposure entity 270 for a wireless communications network 200, in which a data packet session can be provided between a service provider 300 and a user equipment 100, the network exposure entity 270 comprising a processing unit 271 and a memory 273, the memory 273 comprising instructions configured to cause the processing unit 271 to carry out any of the steps described in connection with the network exposure entity 270.

Figure 10:
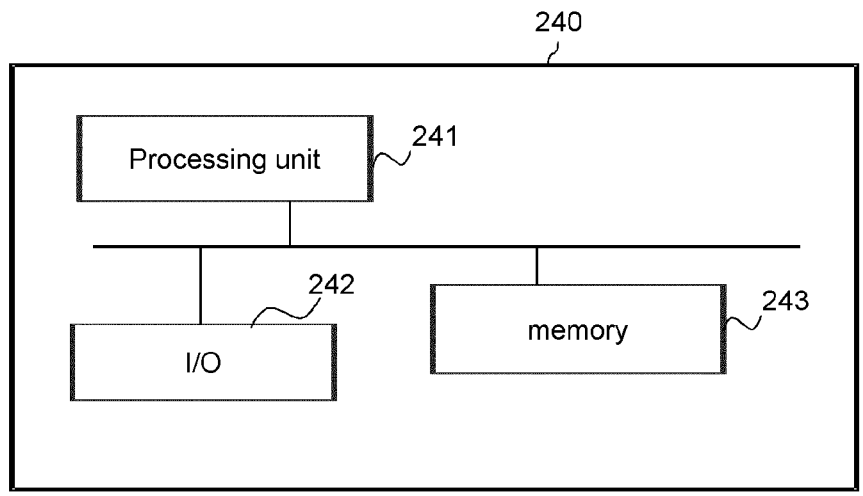
FIG. 10 shows an example schematic of a policy control entity configured for implementing a secure authentication.
Figure 11:
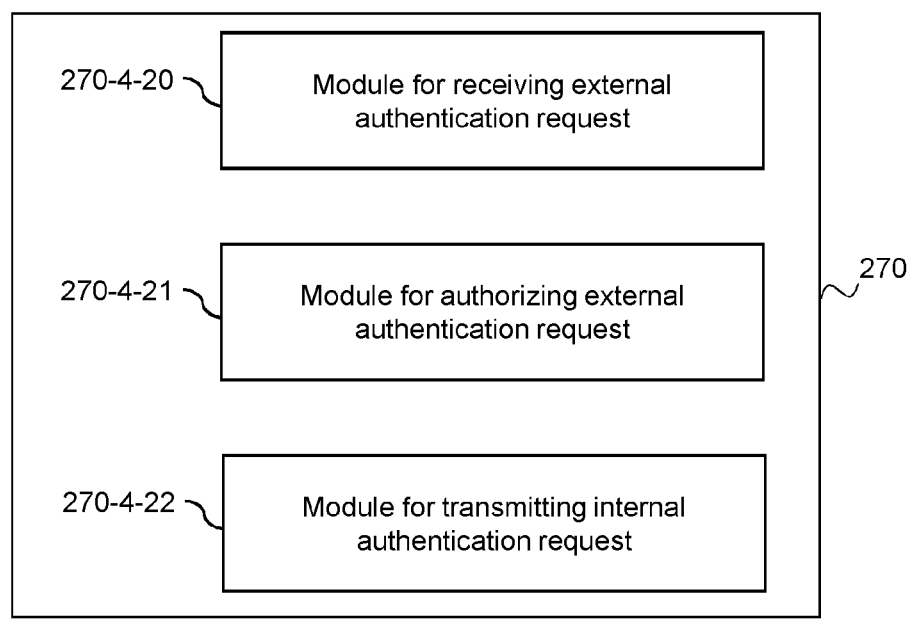
FIGS. 11-13 show examples of modules of a network exposure entity for implementing a secure authentication.
Figure 12:
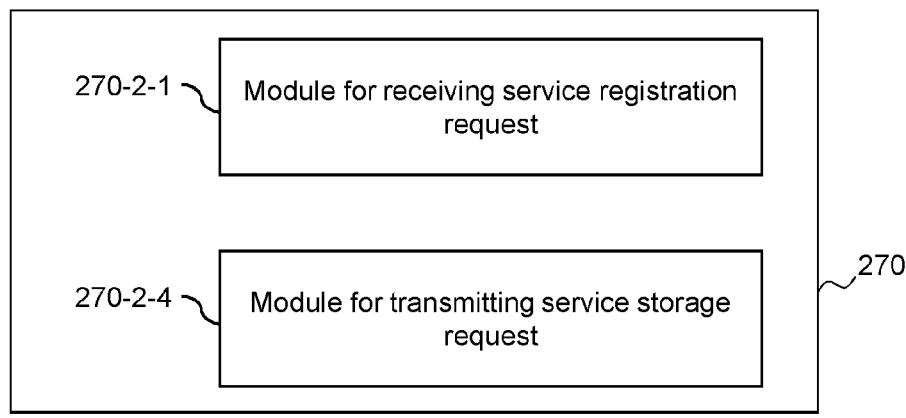
Figure 13:
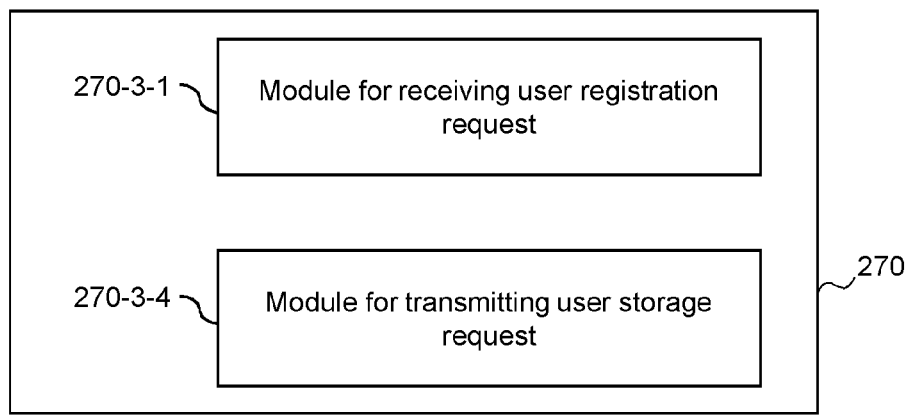
Figure 14:
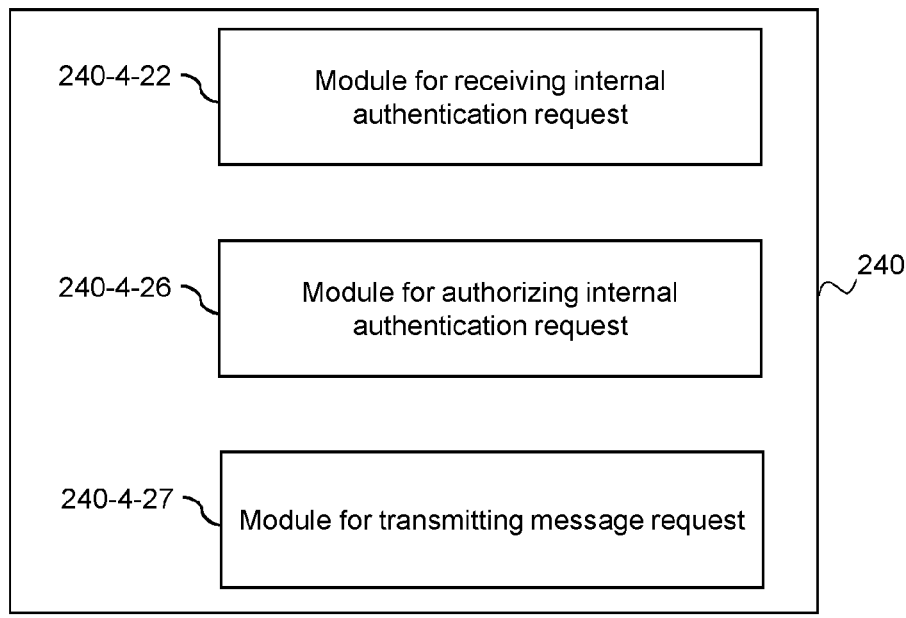
FIG. 14 shows an example of modules of a policy control entity for implementing a secure authentication.

Additionally, as visible in FIG. 10 further embodiments of the invention can relate to a policy control entity 240 for a wireless communications network 200, in which a data packet session can be provided between a service provider 300 and a user equipment 100, the policy control entity 240 comprising a processing unit 241 and a memory 243, the memory 243 comprising instructions configured to cause the processing unit 241 to carry out any of the steps described in connection with the policy control entity 240.

Additionally, as visible in FIGS. 11-14, any of the previously described entity can also be implemented by modules implementing the functionalities of the respectively described steps.

It has thus been described how embodiments of the invention can allow a user authentication triggered by a service provider 300 through the network exposure entity 270 of a wireless communications network 200. Through this procedure, the service provider 300 can request the wireless communications network 200 to take part into authenticating the user, for instance as part of a multi-factor authentication, optionally on a per application/s basis.

The network exposure entity 270 can thus introduce new functionality to allow an boarding procedure and/or a user registration. The network exposure entity 270 can further operate as a first layer to authorize the request from the service provider 300, for instance in order to verify that the user is subscriber in the wireless communications network 200. The network exposure entity 270 can further store in a subscriber database 250 an indication of the one or more users registered for the authentication, preferably in association with one or more applications per user. The network exposure entity 270 can then subsequently additionally authorize the request from the service provider 300, for instance by verifying that the user for which the authentication has been requested is a subscriber in wireless communications network 200 and is also registered for authentication, preferably for the requested application. The network exposure entity 270 can identify the policy control entity 240 handling the user session.

The policy control entity 240 can take part into the PDU session establishment and retrieve from the subscriber database 250 the subscriber data and/or application data, including an indication of the user being registered for authentication for the one or more applications. Based on the above indication, the policy control entity 240 can triggers one or more PCC rules for the one or more applications, including application start event. During user authentication the policy control entity 240 can retrieve from subscriber database 250 the subscriber data and/or application data, including for instance an indication of the user being registered for authentication for the one or more applications, an indication of the user consent for authentication for the one or more applications, the association between the PUI/MSISDN, SUPI/IMSI and PEI/IMEI for MFA for the one or more application—preferably corresponding to the last user authentication procedure. The policy control entity 240 can verify that the user is registered for authentication for the requested application, for instance thanks to an App-ID field included in Nnef_MFA_UserAuthentication request. The policy control entity 240 can further verify user consent for authentication for the requested application thanks for instance to the App-ID field included in Nnef_MFA_UserAuthentication request. The policy control entity 240 can additionally verify that the user has an active PDU session and/or that the IP-Address of the user equipment 10, for instance included in Nnef_MFA_UserAuthentication request, corresponds to the active PDU session. The policy control entity 240 can further verify that the External-User-Identity, for instance included in Nnef_MFA_UserAuthentication request, matches with the PUI/MSISDN for the active PDU session. Additionally, PCF can verify the association between any of the PUI/MSISDN, SUPI/IMSI and PEI/IMEI for MFA for the application. In case there is a mismatch, for instance if a previous user authentication was done from a different device, the policy control entity 240 might invalidate the user authentication procedure. This can be used to avoid the scenario of SIM duplication. The policy control entity 240 can also verify the user is currently running the requested application, for instance thanks to the App-ID included in Nnef_MFA_UserAuthentication request. Optionally, extra checks can be performed, for instance based on the digital footprint of the browser, it might be verified there is a match with previous user authentication procedures.

Based on Authentication-Information included in Nnef_MFA_UserAuthentication request, the policy control entity 240 can trigger an SMS, for instance through a message control entity 260, towards the user. If requested in Authentication-Information, the policy control entity 240 can generate a random temporary pin code to be included in the SMS. In this case, the policy control entity 240 cab also return the value to service provide 300, through the network exposure entity 270. Alternatively or additionally, the SMS towards the user might include a question such as the pet name. Alternatively or in addition, instead of an SMS, the policy control function might trigger a different type of message towards the user. Optionally the Authentication-Information might also include one or more allowed user locations when running user authentication for the application.

The various layers of checks allow an intrinsically secure user authentication procedure. In case of a positive authentication, the policy control entity 240 can proceed to store in the subscriber database 250 the association between any of the PUI/MSISDN, SUPI/IMSI and PEI/IMEI for MFA for the application. This information can then be used for subsequent user authentication procedures, for instance to determine they are from the same device.

The proposed solution thus allow external parties, such as banking companies, to support authentication involving the wireless communications network 200 to authenticate the user equipment 100 and application, resulting in improved security. Furthermore, it solves scenarios of a malicious user having a duplicate SIM card or registering an application with a PUI, MSISDN, different to the one corresponding to the PDU session established.

The invention claimed is:

1. A method for operating a network exposure entity in a wireless communications network, the method comprising:
receiving, from a service provider, an external authentication request for the wireless communications network to execute an authentication of a user equipment with the service provider, wherein the external authentication request comprises:
an identifier of the user equipment, and
an authentication identifier indicating how to execute the authentication;
authorizing the external authentication request based on one or more external criteria, wherein the one or more external criteria comprise whether the user equipment is registered in the wireless communications network; and
transmitting to a policy control entity an internal authentication request configured to cause the wireless communications network to perform the authentication of the user equipment in accordance with the authentication identifier included in the external authentication request.

2. The method of claim 1, wherein:
the authentication identifier indicates an SMS-based authentication, and
the internal authentication request causes the wireless communications network to send an authentication SMS to the user equipment.

3. The method of claim 2, wherein each of the external authentication request, the internal authentication request, and the SMS also includes a security code for the authentication.

4. The method of claim 2 further comprising:
receiving, from the policy control entity in response to the internal authentication request, an internal authentication response indicating successful delivery of the authentication SMS; and
transmitting, to the service provider in response to the external authentication request, an external authentication response indicating successful delivery of the authentication SMS.

5. The method of claim 1, wherein:
the external authentication request further comprises an identifier of the service provider;
the method further comprises, prior to receiving the external authentication request, receiving from the service provider a service registration request that includes a further identifier of a service provider; and
the one or more external criteria further comprise whether the identifier of the service provider received with the external authentication request corresponds to the further identifier of the service provider received with the service registration request.

6. The method of claim 1, wherein:
the method further comprises, prior to receiving the external authentication request, receiving from the service provider a user registration request that includes a further identifier of a user equipment; and
the one or more external criteria further comprise whether the identifier of the user equipment received with the external authentication request corresponds to the further identifier of a user equipment received with the user registration request.

7. The method of claim 1, wherein the identifier of the user equipment comprises one or more of the following: an IP address of the user equipment, and a phone number of the user equipment.

8. A method for operating a network exposure entity in a wireless communications network, the method comprising:
receiving one or more of the following from a service provider, in association with an authentication of a user equipment:
a service registration request for registering with the wireless communications network, wherein the service registration request includes the following:
an identifier of the service provider, and
one or more application identifiers that identify respective one or more applications which can require authentication of the user equipment; and
a user registration request for registering one or more users with the wireless communications network, wherein the user registration request includes the following:
the identifier of the service provider, and
one or more identifiers of user equipment that can require authentication with the service provider, wherein each identifier of a user equipment comprises one or more of the following: an IP address of the user equipment, and a phone number of the user equipment; and
transmitting one or more of the following to a subscriber database:
a service storage request that includes the following: the identifier of the service provider, and the one or more application identifiers; and
a user storage request that includes the following: the identifier of the service provider, and the one or more identifiers of user equipment.

9. The method of claim 8, wherein each of the user registration request and the user storage request also includes one or more application identifiers that identify respective applications which can require authentication of the user equipment.

10. A method for operating a policy control entity in a wireless communications network, the method comprising:
receiving, from a network exposure entity, an internal authentication request for the wireless communications network to execute an authentication of the user equipment with the service provider;
authorizing the internal authentication request based on one or more internal criteria; and
based on authorizing the internal authentication request, transmitting to a message control entity a request to send an authentication message to the user equipment.

11. The method of claim 10, wherein the one or more internal criteria comprise whether the user equipment has an active data packet session in the wireless communications network.

12. The method of claim 10, wherein:
the internal authentication request comprises a phone number, and
the one or more internal criteria comprise whether the phone number corresponds to a phone number of the user equipment.

13. The method of claim 10, wherein:
the internal authentication request comprises an IP address, and
the one or more internal criteria comprise whether the IP address corresponds to an IP address of the user equipment.

14. The method of claim 10, wherein the one or more internal criteria comprise whether an association between at least two of the following has not changed with respect to a previous authentication:
International Mobile Equipment Identity of the user equipment, phone number of the user equipment, and user equipment subscriber information for the wireless communications network.

15. The method of claim 10, wherein:
the method further comprises receiving, from a session control entity, an application identifier indicating execution of an application at the user equipment;
the internal authentication request comprises a further application identifier; and
the one or more internal criteria comprise whether the further application identifier received with the internal authentication request corresponds to the application identifier received from the session control entity.

16. The method of claim 10, wherein:
the method further comprises receiving, from a subscriber database, registration data comprising one or more application identifiers and one or more subscriber identifiers;
the internal authentication request comprises a further application identifier; and
the one or more internal criteria comprise whether the further application identifier received with the internal authentication request corresponds to any of the one or more application identifiers received from the subscriber database.

17. The method of claim 10, further comprising:
receiving from a session control entity a policy request associated with the user equipment;
retrieving from a subscriber database one or more application identifiers that identify respective one or more applications which can require authentication of the user equipment;
generating one or more policies for the user equipment, wherein the one or more indicate that execution of the one or more applications is to be notified to the wireless communications network; and
transmitting the one or more policies to a session control entity.

* * * * *